Jan. 14, 1947.   A. T. SINKS   2,414,128
COMPASS TRANSMITTER
Filed July 30, 1945
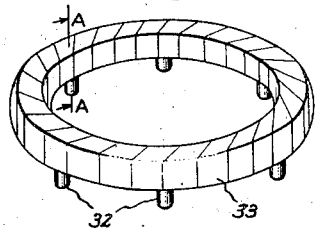
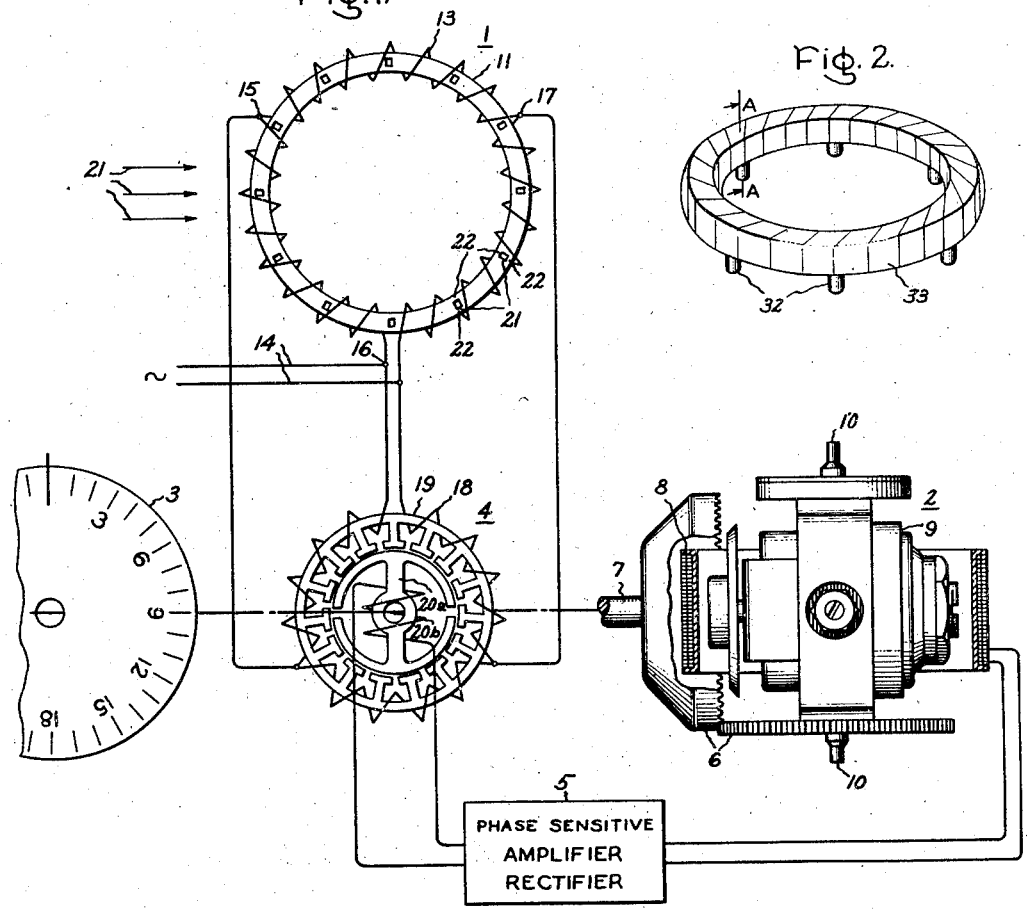
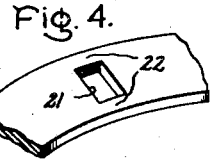
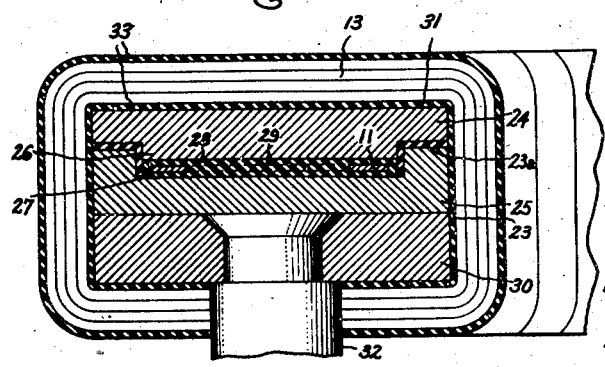
Inventor:
Allen T. Sinks, Deceased,
Anna C. Sinks, Administratrix,
by
Attorney.

Patented Jan. 14, 1947

2,414,128

UNITED STATES PATENT OFFICE 2,414,128

COMPASS TRANSMITTER

Allen T. Sinks, deceased, late of Beach Bluff, Mass., by Anna C. Sinks, administratrix, Beach Bluff, Mass., assignor to General Electric Company, a corporation of New York Application July 30, 1945, Serial No. 607,718

7 Claims. (Cl. 177—380)

1

The present invention relates to magnetic compasses and more particularly to compass transmitters for electrically transmitting the direction of the earth's magnetic field to a location remote from the transmitter for indication or control purposes.

Electromagnetic compass signal transmitters of the so-called second harmonic type have been used heretofore for transmitting the position of a compass magnet to a remote receiver or control device. Such transmitters usually comprise a solid or laminated ring core of highly permeable magnetic material such Mumetal. The core is provided with an exciting winding for periodically saturating the core and the resulting variation in reluctance of the core causes a pulsation in the unidirectional flux threading the core from the adjacent compass magnet whereby second harmonic signal voltages are induced into the winding on the core. The voltages induced about the periphery of the core winding vary in accordance with the orientation of the core relative to the flux pattern produced by the compass magnet and by means of polyphase connections similar to a conventional Selsyn, signal voltages can be obtained from the transmitter which are indicative of the position of the compass magnet.

In a transmitter of this type, known as the slave-magnet type, the compass magnet acts, in effect, as an amplifier of the earth's magnetic field in that the compass magnet, being freely pivoted, aligns itself with the relatively weak earth's magnetic field, and by virtue of its own magnetization provides a magnetic field many times stronger than the earth's field.

In some installations such as on aircraft, the slave-magnet transmitter is disadvantageous in that the pivoted compass magnet is apt to be thrown off during accelerations of the aircraft and thereby give an erroneous reading. Furthermore, vibration encountered on aircraft sometimes adversely affects the compass pivot. It is therefore desirable to have a compass transmitter sufficiently sensitive to provide signal voltages of adequate strength for indication or control purposes in response to the direct effect of the earth's magnetic field so that the pivoted compass magnet amplifier can be eliminated. Such a transmitter is referred to as a direct pick-up type.

While the ring core type of transmitter is very desirable from the standpoint of simplicity in manufacturing, the construction as heretofore used for slave-magnet transmitters has been found to be too insensitive to be of any practical

2 use as a transmitter of the direct pick-up type. Hence, in order to increase the output of the transmitter to a usable value, complicated core structures utilizing radially projecting legs terminating in flux-collecting vanes have been resorted to. Such core structures are difficult to manufacture in that great care must be used to maintain symmetry of construction, as any mechanical error in the placement of the salient poles or legs will result in a corresponding electrical error in the voltage output of the transmitter giving erroneous compass readings. Furthermore, in assembling the core structure, it is difficult to avoid mechanical stressing of the core parts, which stressing is likely to change the magnetic properties of the core in an unsymmetrical manner which results in a signal error.

It is a general object of the present invention to provide an improved magnetic field responsive signal device for producing signal voltages variable in accordance with the orientation of the device in a magnetic field.

A more specific object of the invention is to provide a compass transmitter of the direct pick-up type having a simplified construction which is relatively easy to manufacture.

A further object of the invention is to provide a compass transmitter which has the manufacturing simplicity of the ring core used in slave-magnet compass transmitters, but which is sufficiently sensitive to be used as a direct pick-up type of compass transmitter.

A still further object of the invention is to provide a compass transmitter which is rugged in construction and is highly resistant to mechanical and thermal shock.

Further objects and advantages of the invention will become apparent, and the invention will be better understood from the following description referring to the accompanying drawing and the features of novelty which characterize the invention will be pointed out with particularity in the claims annexed to and forming a part of this specification.

In the drawing, Fig. 1 is a schematic illustration of a compass-controlled directional gyro using a compass transmitter forming the subject matter of the present invention; Fig. 2 is an exterior view of the compass transmitter; Fig. 3 is a cross-sectional view of the compass transmitter taken along the line AA of Fig. 2; and Fig. 4 is an enlarged view of a section of the compass transmitter core.

The compass transmitter forming the subject matter of the present invention may be used for either indication or control purposes. In order to illustrate one way in which the invention may be used, the compass transmitter is shown in Fig. 1 of the drawing as being embodied in a stable azimuth indicating system known as a compass-controlled directional gyro. This stable azimuth indicating system forms the subject matter of a copending application of A. T. Sinks, R. A. Pfuntner, and S. Gabrielson, Serial No. 608,506, filed August 2, 1945, which is assigned to the same assignee as the present invention. Referring to the drawing, the stable azimuth indicating system is shown as comprising a compass transmitter unit 1, a directional gyro 2, an azimuth position-indicating dial 3, a detector Selsyn 4, and a phase-sensitive amplifier rectifier 5. The directional gyro 2 is geared to the dial 3 by means of gearing 6 and a shaft 7 so that the dial 3 is actuated by relative movement between the gyro and its supporting case in a well known manner. In order to prevent the spin axis of the directional gyro from wandering, means are provided for continuously precessing the gyro so that its spin axis is maintained in a predetermined relationship with the magnetic meridian as measured by the compass transmitter unit 1. For this purpose the directional gyro is provided with a torque motor comprising a vertical axis precessing coil 8 which is affixed to the gyro case. The precessing coil 8 when energized with a direct current provides a magnetic flux which reacts with permanent magnets (not shown) mounted on the gyro motor frame 9 in such a manner that the directional gyro is caused to precess about the vertical gimbal axis 10 in a direction dependent upon the direction of the direct current in the precessing coil 8.

The compass transmitter 1 forming the subject matter of the present invention and which will be subsequently described in greater detail, comprises an annular core 11 of permeable magnetic material such as Mumetal on which is wound a toroidal exciting winding 13, the single phase end connections of which are connected to a suitable source of alternating current 14. The transmitter winding 13 is provided with symmetrically spaced tapped polyphase connections 15, 16, and 17 which are symmetrically connected to a toroidal winding 18 wound on the annular stator 19 of the detector Selsyn 4. The stator winding 18 is also energized from the alternating current supply 14. The detector Selsyn has a rotor 20a mechanically coupled to the directional gyro shaft 7, the rotor being provided with a winding 20b which is electrically connected to the input of the phase-sensitive amplifier rectifier 5. The compass transmitter unit 1 is preferably stabilized in a horizontal plane by any suitable means such as a pendulum or gyro vertical (not shown) so that the horizontal component of the earth's magnetic field indicated by the arrows 21 passes through the core 11 in an edgewise direction. The alternating exciting current flowing in the winding 13 causes a periodic saturation of the core which results in a pulsation of the unidirectional flux passing through the core. This pulsating unidirectional flux causes second harmonic voltages and currents to be induced in the winding 13, the phase and magnitude of which are indicative of the orientation of the transmitter relative to the external unidirectional field 21. These second harmonic voltages and currents are conducted to the stator winding 18 of the detector Selsyn 4 by means of the connections previously described, and cause an alternating flux to flow diametrically across the stator of the Selsyn, the axis of this alternating current flux varying in accordance with the orientation of the unidirectional flux 21 relative to the compass transmitter 1. The rotor 19 of the detector Selsyn is mounted on the directional gyro shaft 7 in such a manner that when the spin axis of the directional gyro is aligned with the magnetic meridian, the magnetic axes of the rotor and stator of the Selsyn 4 are mutually perpendicular and no voltage is induced in the rotor winding 20b. If the directional gyro departs from the predetermined relationship, the rotor axis of the detector Selsyn shifts relative to the stator axis and a voltage is induced in the rotor winding 20b the phase or polarity of which is indicative of the direction of the departure. This error voltage induced in the winding 20b is rectified and amplified by the phase sensitive amplifier rectifier 5 and is transmitted to the precessing coil 8 of the torque motor whereupon the directional gyro is caused to precess into correspondence with the magnetic meridian as measured by the compass transmitter 1.

The compass transmitter unit disclosed in the above-mentioned copending application is of the so-called slave-magnet type, and utilizes a pivotally mounted compass magnet which aligns itself with the horizontal component of the earth's magnetic field. The compass magnet being itself strongly magnetized, supplies a unidirectional flux to the transmitter core which is many times stronger than the earth's field. As pointed out before, there are some applications where it is desirable to eliminate the pivoted compass magnet and utilize the direct effect of the earth's magnetic field on the compass transmitter core to generate the second harmonic signal voltages.

Transmitter units heretofore used in slave-magnet types of transmitters have comprised a solid or laminated core on which the exciting and coupling windings have been wound. This ring core construction is very desirable from the standpoint of simplicity of manufacture, but it has been found that these transmitters are too insensitive to respond to the relatively weak earth's magnetic field. This insensitivity has been found to be caused by the permeability characteristic of the high permeability magnetic materials, such as Mumetal, of which the transmitter cores are formed. The permeability of these materials is low when the flux density is low. As the flux density increases, the permeability increases considerably up to a point where the flux density is sufficient to saturate the material, at which point the permeability drops off sharply to a very low value. The difficulty with the solid or laminated ring cores heretofore used is that if the area of the core is made sufficiently large to pick up a usable amount of the weak earth's magnetic field, the flux density of the core is low so that the reluctance of the core is high due to the low permeability of the magnetic material. On the other hand, if the area of the core is made small enough to raise the flux density to the region of high permeability, the reluctance of the core is still high due to the small cross-sectional area. Therefore there is a relatively small change in reluctance between the saturated and non-saturated condition of the core which results in relatively small induced second harmonic signal voltages. As a result, solid or laminated cores are too insensitive to be operated directly by the earth's magnetic field.

According to one aspect of the present invention, the construction of the compass transmitter ring core is modified in a relatively simple manner so as to greatly increase the sensitivity of the transmitter to the direct effect of the earth's magnetic field to a point where the pivoted compass magnet can be eliminated. As shown in Figs. 1 and 3 of the drawing, the annular core 11 is provided with a plurality of equally spaced rectangular perforations or windows 21 which can conveniently be punched by means of a die at the same time that the ring is formed. The cross-sectional areas 22 of the core at the locations of the windows are considerably smaller than the cross-sectional areas of the intermediate portions of the core so that the closed magnetic circuit of the core is provided with a series of spaced-apart restrictions. By suitably selecting the size of the windows, a cross-sectional area of the restricted sections 22 may be obtained such that the flux density produced by the earth's field in the restricted sections is sufficiently high to give a high permeability. Also by properly selecting the size of the window, the length of the restricted sections 22 can be made relatively short so that the reluctance drop in the ring for the unsaturated condition can be made relatively low. For example, good results have been obtained using an annular ring formed of Mumetal having an outer diameter of 3.625 inches, an inner diameter of 3.250 inches and a thickness of 0.003 inch. The ring was provided with twelve equally spaced windows, each window measuring 0.125 inch wide and 0.070 inch long.

With the restricted sections in the core, the earth's field produces a flux density in the restricted sections which is high enough to be in the region of high permeability and due to the fact that the length of the restricted sections is relatively short, the reluctance of the core is low for an unsaturated condition. When the exciting current in the winding 13 saturates the restricted sections, the permeability of the ring is greatly reduced whereupon the reluctance is high. The large change in reluctance between the saturated and non-saturated conditions as obtained with this core construction results in much higher induced second harmonic voltages than are obtainable with the solid type of core. Stated in another way, this core construction gives second harmonic signal voltages of useful magnitude in response to relatively weak external fields such as the earth's magnetic field.

Another advantage of the core construction with restricted sections or windows as compared with the solid core is that spurious signals arising from hysteresis effects are far less troublesome. If the core becomes magnetized due to a direct current field, the core retains a certain amount of permanent magnetism which results in second harmonic voltage signals such as would be produced by an external field which is fixed relative to the core. This gives a signal error comparable to that produced by permanent magnetism of the vehicle on which the compass is carried. With the restricted core section the flux density caused by the permanent magnetism is a much smaller percentage of the flux density produced by the earth's field which is being measured, and therefore the percentage of signal error is much lower than in the case of the solid core where the flux density produced by the earth's field is low compared to that caused by the permanent magnetism of the core.

According to another aspect of the present invention, the perforated core 11 of the compass transmitter 1 is mounted and supported in an improved manner so that the exciting winding 13 may be easily applied and so that the core will be protected against stressing by mechanical or thermal shock conditions. As best shown in Fig. 3 of the drawing, the core 11 is enclosed in a casing 23 comprising two mating circular sections 24 and 25 preferably formed of a rigid, non-magnetic material such as, for example, a nickel-copper alloy known as Monel metal. As shown, the section 24 has a downwardly projecting tongue portion 26 which is received in a channel-shaped recess 27 in the section 25. The dimensions of the tongue 26 are selected such that when the parts 24 and 25 are fitted together, there is a recess 28 between the two sections in which the annular core 11 is received. Prior to assembly, the recess 27 of section 25 is filled with a pliable insulating material such as an asphalt compound and the ring core 11 is then floated in this material. When the upper section 24 is assembled, the tongue portion 26 holds the core in place but the compound 29 permits a certain amount of yielding movement between the core and the supporting case, and in this manner the transmission of any mechanical or thermal stresses from the casing to the core such as would be likely to bend the core and change its magnetic properties is prevented.

In order to prevent the flow of induced currents between the two mating sections of the casing 23, the sections 24 and 25 are spaced apart by a layer 23a of suitable electrical insulating material. This prevents the metallic casing sections from acting as a short-circuited turn.

In order to provide convenient means for mounting the casing 23, the casing is supported on an annular, non-magnetic, metallic ring 30 which, for example, may be made of brass, and the entire assembly, including the casing sections 24 and 25 and the ring 30, are bound together by means of a suitable tape winding 31. Depending supporting legs 32 are attached to the ring 30 and provide a convenient means for supporting the entire assembly.

After the core 11 has been assembled in the supporting casing, the entire assembly may be placed in a conventional toroidal coil winding machine for the purpose of applying the winding 13. Due to the fact that the casing 23 completely protects the magnetic core 11, no special precautions need be taken during the coil winding operation to prevent mechanical stressing of the core. This is obviously a great advantage from the manufacturing standpoint. After the coil winding operation is complete, the winding may be protected by the application of a suitable electrical insulating tape 33, as shown.

It should be understood that the present invention is not limited to the simplified winding arrangement of the compass transmitter shown in Fig. 1 where the exciting winding 13 is provided with polyphase connections to tap off the induced second harmonic signal voltages. If desired, coupling windings may be added to the core and connected to cancel out induced voltages of the fundamental excitation frequency leaving the second harmonic signal voltages.

From the foregoing it will be apparent that there has been provided, according to the present invention, an improved second harmonic compass transmitter unit which is sufficiently sensitive to be responsive to the direct effect of the earth's magnetic field on the core of the transmitter, and also permits the use of the ring-shaped core which is very desirable from the standpoint of manufacturing simplicity.

While particular embodiments of the invention have been shown and described, it will occur to those skilled in the art that various changes and modifications may be made without departing from the invention, and therefore the appended claims are intended to cover all such changes and modifications as fall within the true spirit and scope of the invention.

What is claimed as new and desired to be secured by Letters Patent of the United States is:

1. An electromagnetic device for producing signal voltages variable in accordance with the orientation of said device in a magnetic field comprising an annular core of permeable magnetic material, said core being provided with a plurality of spaced-apart perforations around the periphery thereof to provide a closed magnetic circuit having alternate large and small cross-sectional areas, and winding means on said core.

2. An electromagnetic device for producing signal voltages variable in accordance with the orientation of said device in a magnetic field comprising a closed core of permeable magnetic material, said core being formed to provide a plurality of serially arranged restricted sections having cross-sectional areas which are smaller than the main body of said core, and winding means on said core.

3. An electromagnetic device for producing signal voltages variable in accordance with the orientation of said device in a magnetic field comprising an annular core of permeable magnetic material, said core having a plurality of equally spaced perforations around the periphery thereof to provide a plurality of serially arranged core sections having alternate relatively large and small cross-sectional areas, and winding means on said core.

4. A compass transmitter comprising an annular core of permeable magnetic material, said core being provided with a plurality of spaced-apart serially arranged restricted sections, winding means on said core having single phase connections and polyphase connections, means for supplying said single phase connections with a periodically varying exciting current whereby second harmonic voltages are produced across said polyphase connections which are variable in accordance with the orientation of said core in the earth's magnetic field.

5. A magnetic core construction for a compass transmitter of the second harmonic type comprising an annular ring formed of permeable magnetic material, said ring having a plurality of spaced apart windows to provide a plurality of serially arranged sections of restricted cross-sectional area.

6. An electromagnetic device comprising a ring of permeable magnetic material, a toroidal casing of non-magnetic, metallic material surrounding and supporting said ring, said casing being formed of two mating circular sections, a toroidal exciting winding wound around said casing, said winding being operative when energized with a periodically varying current to periodically saturate said ring and electrical insulating means between the said two mating sections of said casing for preventing the flow of induced currents in said casing.

7. An electromagnetic device comprising a ring of permeable magnetic material, a non-magnetic toroidal casing supporting and surrounding said ring, a toroidal winding wound around said casing, and a pliable material surrounding said ring and separating said ring from the inner surface of said casing to prevent transmission of thermal and other stresses from casing to said ring which stresses, if not prevented, would be likely to cause a change in the magnetic properties of said ring and the voltages induced in said winding.

ANNA C. SINKS,
*Administratrix of the Estate of Allen T. Sinks, Deceased.*